US006987989B2

(12) United States Patent
Hiramatsu et al.

(10) Patent No.: US 6,987,989 B2
(45) Date of Patent: Jan. 17, 2006

(54) BASE STATION APPARATUS PROVIDED WITH ARRAY ANTENNAS

(75) Inventors: Katsuhiko Hiramatsu, Yokosuka (JP); Osamu Kato, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 595 days.

(21) Appl. No.: 09/979,017

(22) PCT Filed: Mar. 14, 2001

(86) PCT No.: PCT/JP01/02001

§ 371 (c)(1),
(2), (4) Date: Nov. 15, 2001

(87) PCT Pub. No.: WO01/71944

PCT Pub. Date: Sep. 27, 2001

(65) Prior Publication Data

US 2002/0159118 A1 Oct. 31, 2002

(30) Foreign Application Priority Data

Mar. 21, 2000 (JP) .......................... 2000-078410

(51) Int. Cl.
*H04M 1/00* (2006.01)

(52) U.S. Cl. .................... 455/562.1; 455/561; 455/560; 455/67.11; 455/25; 455/63.4; 455/424; 398/115; 398/141; 398/158; 398/118; 370/277; 370/279; 370/315; 370/527; 370/334

(58) Field of Classification Search ............. 455/562.1, 455/561, 67.11, 7, 25, 63.4, 63.1, 9, 11.1; 398/115, 158, 141; 370/277, 279, 315, 527; 359/139

See application file for complete search history.

(56) References Cited

U.S. PATENT DOCUMENTS

| 5,339,184 | A | | 8/1994 | Tang |
|---|---|---|---|---|
| 5,648,961 | A | * | 7/1997 | Ebihara ..................... 370/282 |
| 5,982,327 | A | | 11/1999 | Vook et al. |
| 6,336,042 | B1 | * | 1/2002 | Dawson et al. .......... 455/562.1 |
| 6,337,754 | B1 | * | 1/2002 | Imajo ........................ 398/115 |
| 6,362,906 | B1 | * | 3/2002 | O'Shea ...................... 398/126 |
| 6,374,124 | B1 | * | 4/2002 | Slabinski ................. 455/562.1 |
| 6,385,441 | B1 | * | 5/2002 | Takakusaki .............. 455/226.1 |
| 6,556,325 | B1 | * | 4/2003 | Horiuchi et al. ............ 398/177 |
| 6,708,020 | B1 | * | 3/2004 | Hiramatsu et al. ........... 455/65 |

FOREIGN PATENT DOCUMENTS

| DE | 3441462 A1 | * | 5/1985 |
|---|---|---|---|
| DE | 3441462 | | 5/1985 |
| EP | 0843380 | | 5/1998 |
| JP | 04157820 | | 5/1992 |
| JP | 05022216 | | 1/1993 |
| JP | 05030020 | | 2/1993 |
| JP | 06077865 | | 3/1994 |
| JP | 10336149 | | 12/1998 |
| JP | 11215543 | | 8/1999 |
| JP | 11261474 | | 9/1999 |
| WO | 9600466 | | 1/1996 |

OTHER PUBLICATIONS

International Search Report dated Jun. 26, 2001.
Supplementary European Search Report dated Jun. 25, 2003.

* cited by examiner

*Primary Examiner*—Marsha D. Banks-Harold
*Assistant Examiner*—Willie J Daniel, Jr.
(74) *Attorney, Agent, or Firm*—Stevens, Davis, Miller & Mosher, LLP

(57) ABSTRACT

In an array-antenna base-station apparatus 100, a relay-station apparatus 110 and a control-station apparatus 120 are connected with optical cables 140, 150, and, moreover, calibration of the whole apparatus 100 is performed to improve the performances of the above whole apparatus 100.

7 Claims, 6 Drawing Sheets

BASE STATION APPARATUS PROVIDED WITH ARRAY ANTENNAS

TECHNICAL FIELD

The present invention relates to a base station apparatus using an adaptive array-antenna technology which adaptively controls directivity by adding weights to the outputs of a plurality of antenna elements.

BACKGROUND ART

A base station apparatus (hereinafter, sometimes called as "array-antenna base-station apparatus") using an adaptive array-antenna (hereinafter, sometimes called as "AAA") comprises a plurality of antennas elements, and freely set the directivity by adjusting the amplitude and the phases of signals received with each antenna element. The directivity is formed by multiplication of received signals or transmitting signals by complex coefficients (hereinafter, the complex coefficient is called as "weight").

The array-antenna base-station apparatus may intensely receive only signals from a desired direction by adjusting the above weights to be multiplied. This is called as "have adjustable received-directivity". The array-antenna base-station apparatus may keep the received SIRs (Signal to Interference Ratios) of signals arriving from each direction high by having the received directivity so that a desired signal is received in an optimum manner.

On the other hand, a micro-cell method, in which a range (cell) to be covered by one base station is reduced, has been noticed in a mobile communication field from a viewpoint of reuse of frequencies. As the number of radio base stations necessary for serving the same area is increased in the above micro-cell method, there have been problems that there are limitations on the installation space, weight, size and so on, and handover is frequently generated.

A radio base station apparatus in which a relay-station apparatus and a control-station apparatus are connected using metallic cables has bee proposed as means for solving the above problems. The above radio base station apparatus has a configuration where a control-station apparatus, which mainly comprises a radio modem section and a control section in a conventional base section, is centralized and arranged in the center, and a large number of relay-station apparatuses, which mainly comprise antennas and transmitting and receiving amplifiers, are provided. Thereby, the above limitation on the installation space may be eliminated, as the above base station may be made smaller and lighter. Moreover, the handover processing may be also performed with the above control-station apparatus in a centralized manner.

FIG. 1 is a block diagram showing a configuration of a conventional array-antenna base-station apparatus using metallic cables for connecting the above control-station apparatus and the above relay-station apparatus. Here, only the receiving side of the array-antenna base-station apparatus is shown for brief description. In addition, only one relay-station apparatus is shown in the drawing for brief description, though the control-station apparatus is generally connected to a large number of relay-station apparatuses.

As shown in the drawing, a relay-station apparatus 11 has a configuration comprising: antennas 12-1 through 12-N; and receiving amplifiers 13-1 through 13-N. A control-station apparatus 21 has a configuration comprising; frequency conversion sections 22-1 through 22-N; and a demodulating section 23. The above relay-station apparatus 11 and control-station apparatus 21 are connected through metallic cables 31-1 through 31-N.

As the same manner is used for processing of any received signals on N different paths corresponding to each of the above antennas 12-1 through 12-N, processing on only the path corresponding to the antennas 12-1 will be described below.

In the relay-station apparatus 11, the above receiving amplifier 13-1 amplifies received signals which are received from a communication terminal apparatus (not shown) of a communication end through the antenna 12-1, and outputs the amplified signals to the above frequency conversion section 22-1 through the metallic cable 31-1. In the control-station apparatus 21, the frequency conversion section 22-1 converts the frequency of the received signals from the receiving amplifier 13-1 from a radio frequency band to a baseband frequency one for output to the demodulating section 23. The above demodulating section 23 demodulates received signals (baseband signals) output from the frequency conversion sections 22-1 through 22-N by multiplication of the above signals by weights.

Then, processing of received signals taken into the base station apparatus with the above configuration will be described.

Received signals, which have been taken into the relay-station apparatus 11 through the antenna 12-1, from a communication terminal apparatus (not shown) are sent to the control-station apparatus 21 through the metallic cable 31-1. The received signals sent to the control-station apparatus 21 are amplified in the frequency conversion section 22-1, and thereafter, demodulated in the demodulating section 23 after multiplication by weights. Thus, the received SIRs may be kept high in the array-antenna base-station as the above array-antenna base-station may intensely receive signals from a specified direction by multiplication of the received signals by weights.

However, the above conventional array-antenna base-station apparatus has had the following problems:

1) Loss in transmitted signals is large, as metallic cables are used for signal transmission from the relay-station apparatus to the control-station apparatus.

2) There are limitations on the installation space, as it is required to transmit signals taken in from a plurality of antenna elements, and larger number of metallic cables are increased.

3) The signals received through each antenna element reaches the demodulating section 23, passing through a path corresponding to each antenna element. The characteristics of the above paths depend on the differences of the characteristics between analog devices provided in amplifiers, and so on. Accordingly, the directivity obtained in the demodulating section deviates from the desired one due to unknown amplitude fluctuations and the phase rotations added to each received signal. Though the characteristics of each path may be previously measured at installation for adjusting the deviations, it is difficult to maintain the desired directivity for a long time, as the above characteristics of each path changes with the passage of time according to the changes in the temperature and so on.

DISCLOSURE OF THE INVENTION

The object of the present invention is to provide an array-antenna base-station apparatus in which loss in signals, which are transmitted from a relay-station apparatus to a control-station apparatus, is small; there are larger degrees of freedom in selection of installation sites; and, furthermore, the amplitude fluctuations and the phase rotations, and so on caused by characteristics of analog devices on each path may be calibrated.

Inventors of the present invention have noticed that loss at transferring signals may be reduced, and an installation space may be saved by use of optical cables for cables connecting the relay-station apparatus and the control-station apparatus of a radio base station. In addition, the above inventors of the present invention have noted that weights may be calculated with good accuracy by measuring characteristic errors caused in transmitting and received signals by analog devices of each radio receiving circuits with known signals.

That is, the object of the present invention is realized by the array-antenna base-station apparatus in which the relay-station apparatus and the control-station apparatus are connected with the optical cables; in addition, characteristic errors added by analog devices are measured, using calibration signals which are known signals; and the measured characteristic-errors are cancelled from the received signals and the transmitting signals.

BEST MODE FOR CARRYING OUT THE INVENTION

Hereinafter, a best mode for carrying out the present invention will be described in detail, referring to attached drawings.
(Embodiment)

Figure 1:
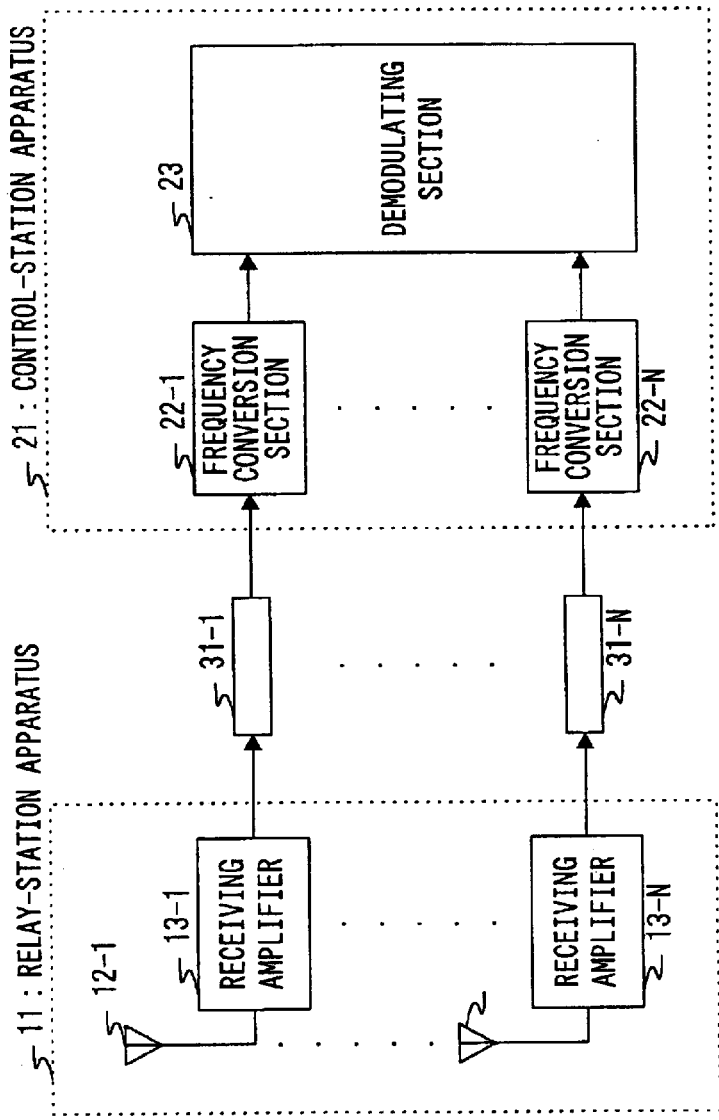
FIG. 1 is a block diagram showing a configuration of a conventional array-antenna base-station apparatus using metallic cables for connecting a control-station apparatus and a relay-station apparatus.
Figure 2:
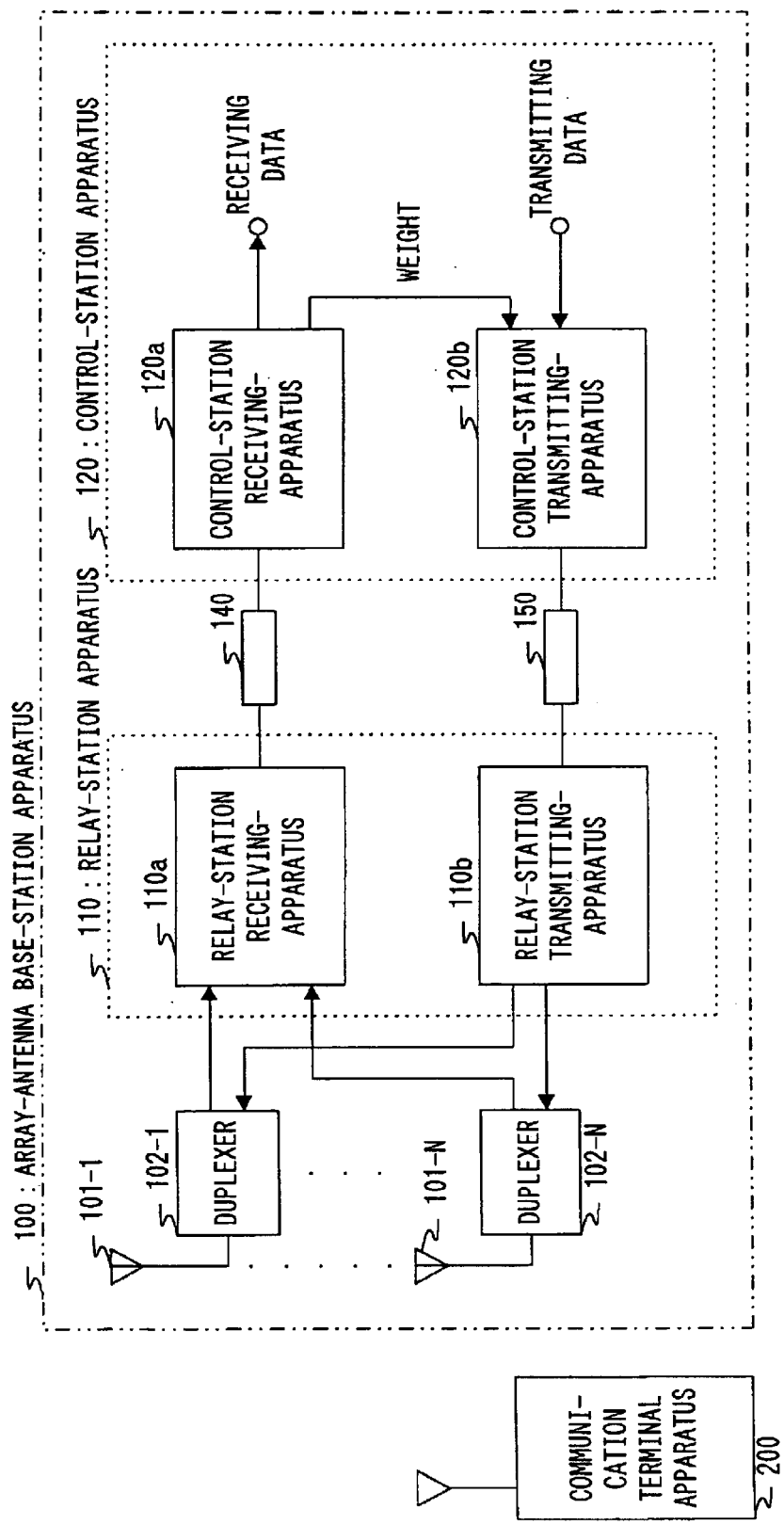
FIG. 2 is a block diagram showing a schematic configuration of an array-antenna base-station apparatus according to one embodiment of the present invention.

In the first place, the schematic configuration of an array-antenna base-station apparatus according to one embodiment of the present invention will be described. FIG. 2 is a block diagram showing a schematic configuration of the array-antenna base-station apparatus according to the one embodiment of the present invention.

As shown in the above drawing, an array-antenna base-station apparatus 100 comprises: antenna elements 101-1 through 101-N; duplexers 102-1 through 102-N; a relay-station apparatus 110; a control-station apparatus 120; and optical cables 140, 150. The above optical cables 140, 150 are distributing cables using optical fiber cables. The above relay-station apparatus 110 comprises: a relay-station receiving apparatus 110a; and a relay-station transmitting apparatus 110b. The above control-station apparatus 120 comprises: a control-station receiving apparatus 120a; and a control-station transmitting apparatus 120b.

The above duplexer 102-1 switches between the receiving side and the transmitting side. That is, in the case of receiving, the duplexer 102-1 outputs received signals from the antenna elements 101-1 through 101-N to the relay-station receiving apparatus 110a, and in the case of transmitting, transmits transmitting signals from the relay-station transmitting apparatus 110b through the antenna elements 101-1 through 101-N.

The relay-station receiving apparatus 110a performs predetermined processing, such as receiving amplification, of the received signals, and outputs the processed signals to the above control-station receiving apparatus 120a through the optical cable 140. The control-station receiving apparatus 120a forms directivity by multiplying the output signals from the relay-station receiving apparatus 110a by weights. And, the control-station receiving apparatus 120a obtains received data after demodulating processing of signals forming the directivity.

The control-station transmitting apparatus 120b generates transmitting signals after modulating processing of transmitting data, and, at the same time, forms directivity for the above generated transmitting signal, referring to the weights which have been calculated by the control-station receiving apparatus 120a. The generated transmitting signals are output to the relay-station transmitting apparatus 110b through the optical cable 150. The relay-station transmitting apparatus 110b outputs the output signals from the control-station transmitting apparatus 120b through the antenna elements 101-1 through 101-N after transmitting processing such as transmitting amplification.

Here, a plurality of relay-station apparatuses are usually installed in one control-station apparatus, and each of the above relay-station apparatuses is connected to the control-station apparatus 120 through the optical cables when a plurality of relay-station apparatuses are installed, though only one relay-station apparatus 110 is shown in FIG. 2 for brief description.

Then, the configuration of the array-antenna base-station apparatus 100 will be described separately for the receiving side and the transmitting side. For the above description, the receiving side will be described referring to FIG. 3, and the transmitting side will be done referring to FIG. 4.
<Receiving Side>

Figure 3:
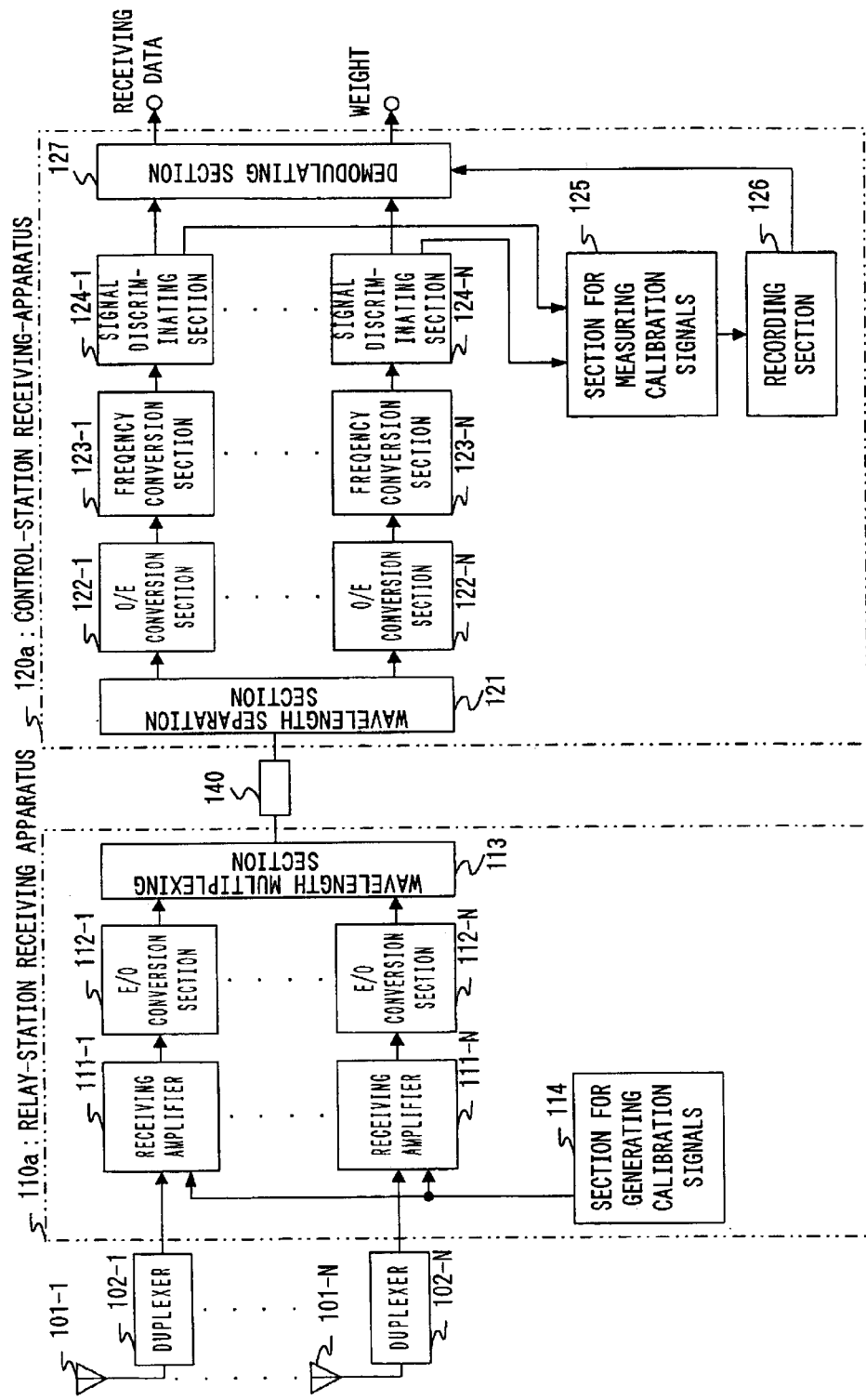
FIG. 3 is a block diagram showing a configuration of the receiving side of the array-antenna base-station apparatus according to the one embodiment of the present invention.

FIG. 3 is a block diagram showing a configuration of the receiving side of the array-antenna base-station apparatus according to the present embodiment. As shown in the above drawing, the relay-station receiving apparatus 110a comprises: receiving amplifiers 111-1 through 111-N; E/O (electric/optical) conversion sections 112-1 through 112-N; a wavelength multiplexing section 113; and a section 114 for generating calibration signals. And, the control-station receiving apparatus 120a comprises: a wavelength separation section 121; O/E (optical/electric) conversion sections 122-1 through 122-N; frequency conversion sections 123-1 through 123-N; signal discriminating sections 124-1 through 124-N; a section 125 for measuring calibration signals; a recording section 126; and a demodulating section 127. The relay-station receiving apparatus 110a and the control-station receiving apparatus 120a are connected to each other through the optical cable 140.

In the relay-station receiving apparatus 110a, the section 114 for generating calibration signals generates known signals for calibration (hereinafter, called as "calibration signals"), and outputs the above known signal to the receiving amplifiers 111-1 through 111-N. The receiving amplifier 111-1 amplifies calibration signals from the section 114 for generating calibration signals, and received signals from the communication terminal apparatus 200 (refer to FIG. 2) through the antenna element 101-1, respectively, and outputs the above calibration signals from the section 114 for generating calibration signals, and received signals from the communication terminal apparatus 200 to the E/O conversion section 112-1. Similarly, the receiving amplifier 111-N amplifies calibration signals from the section 114 for generating calibration signals, and received signals from the communication terminal apparatus 200 through the antenna element 101-N, respectively, and outputs the above calibration signals from the section 114 for generating calibration signals, and received signals from the communication terminal apparatus 200 to the E/O conversion section 112-N. The above E/O conversion section 112-1 converts the calibration signals and the received signals from the receiving amplifier 111-1 into optical signals for output to the wavelength multiplexing section 113. Similarly, the above E/O conversion section 112-N converts the calibration signals and the received signals from the receiving amplifier 111-N into optical signals for output to the wavelength multiplexing section 113. The above wavelength multiplexing section 113 multiplexes the calibration signals and the received signals, which have been converted respectively into optical signals in the E/O conversion sections 112-1 through 112-N, and outputs the above calibration and received signals to the wavelength separation section 121 through the optical cable 140.

In the control-station receiving apparatus 120a, the wavelength separation section 121 separates the calibration signal and the received signals, which have been multiplexed, from the relay-station receiving apparatus 110a into signals on each path, respectively, and outputs the separated signals to the corresponding O/E conversion sections 122-1 through 122-N. That is, the above wavelength separation section 121 outputs, among multiplexed signals from the wavelength multiplexing section 113, the received signals and the calibration signals sent on a path passing through the receiving amplifier 111-1, the E/O conversion section 112-1, and the wavelength multiplexing section 113 to the O/E conversion section 122-1. Similarly, the above wavelength separation section 121 outputs, among the multiplexed signals from the wavelength multiplexing section 113, the received signals and the calibration signals sent on a path passing through the receiving amplifier 111-N, the E/O conversion section 112-N, and wavelength multiplexing section 113, to the O/E conversion section 122-N.

The O/E conversion section 122-1 converts the output signals from the wavelength separation section 121 into electric signals for output to the frequency conversion section 123-1. Similarly, the O/E conversion section 122-N converts the output signals from the wavelength separation section 121 into electric signals for output to the frequency conversion section 123-N. The frequency conversion section 123-1 converts the frequency of the output signals from the O/E conversion section 122-1 to a baseband frequency band, and outputs the converted signals to the signal discriminating section 124-1. Similarly, the frequency conversion section 123-N converts the frequency of the output signals from the O/E conversion section 122-N to a baseband frequency band, and outputs the converted signals to the signal discriminating section 124-N. The above signal discriminating section 124-1 discriminates the received signals from signals output from the frequency conversion section 123-1 for output to the demodulating section 127. And, the above signal discriminating section 124-1 discriminates the calibration signals from the signals output from the frequency conversion section 123-1 for output to the section 125 for measuring calibration signals. Similarly, the signal discriminating section 124-N discriminates the received signals from signals output from the frequency conversion section 123-N for output to the demodulating section 127. And, the above signal discriminating section 124-N discriminates the calibration signals from the signals output from the frequency conversion section 123-N for output to the section 125 for measuring calibration signals.

The section 125 for measuring calibration signals measures superimposed characteristic errors on the calibration signals output from the signal discriminating sections 124-1 through 124-N. Amplitude fluctuations and phase rotations, which have been caused by analog devices which exist on paths from the section 114 for generating calibration signals to the section 125 for measuring calibration signals, are added as characteristic errors to the above calibration signals. The section 125 for measuring calibration signals obtains deviations from the expectation values of the calibration signals output from the signal discriminating sections 124-1 through 124-N, and the above deviations are supposed to be the characteristic errors. The above characteristic errors which have been measured for each path as described above are output to the recording section 126. The recording section 126 preserves the above characteristic errors output from the above section 125 for measuring calibration signals in calibration tables. As the above characteristic errors are separately measured for each path in the receiving side, the same number (that is, "N pieces") of calibration tables as that of paths in the receiving side are separately made.

The demodulating section 127 cancels the characteristic errors superimposed on the received signals which have been output from the signal discriminating sections 124-1 through 124-N, referring to the characteristic errors preserved in the calibration tables stored in the recording section 126. And, the above demodulating section 127 calculates the weights, so that received signals arriving from a desired direction may be intensely received (or, interference signals arriving from a predetermined direction may be suppressed), based on the received signals which have cancelled the characteristic errors, and the calculated weights are multiplied by the received signals on each path. The above demodulating section 127 generates combined signals by mutual addition of the received signals, which have been multiplied by the weights, on each path. The above demodulating section 127 obtains the received data by predetermined demodulating processing of the combined signals which have been generated as described above. Moreover, the above demodulating section 127 outputs the calculated weights to a modulating section 224 (refer to FIG. 4) in the transmitting side.

Figure 5:
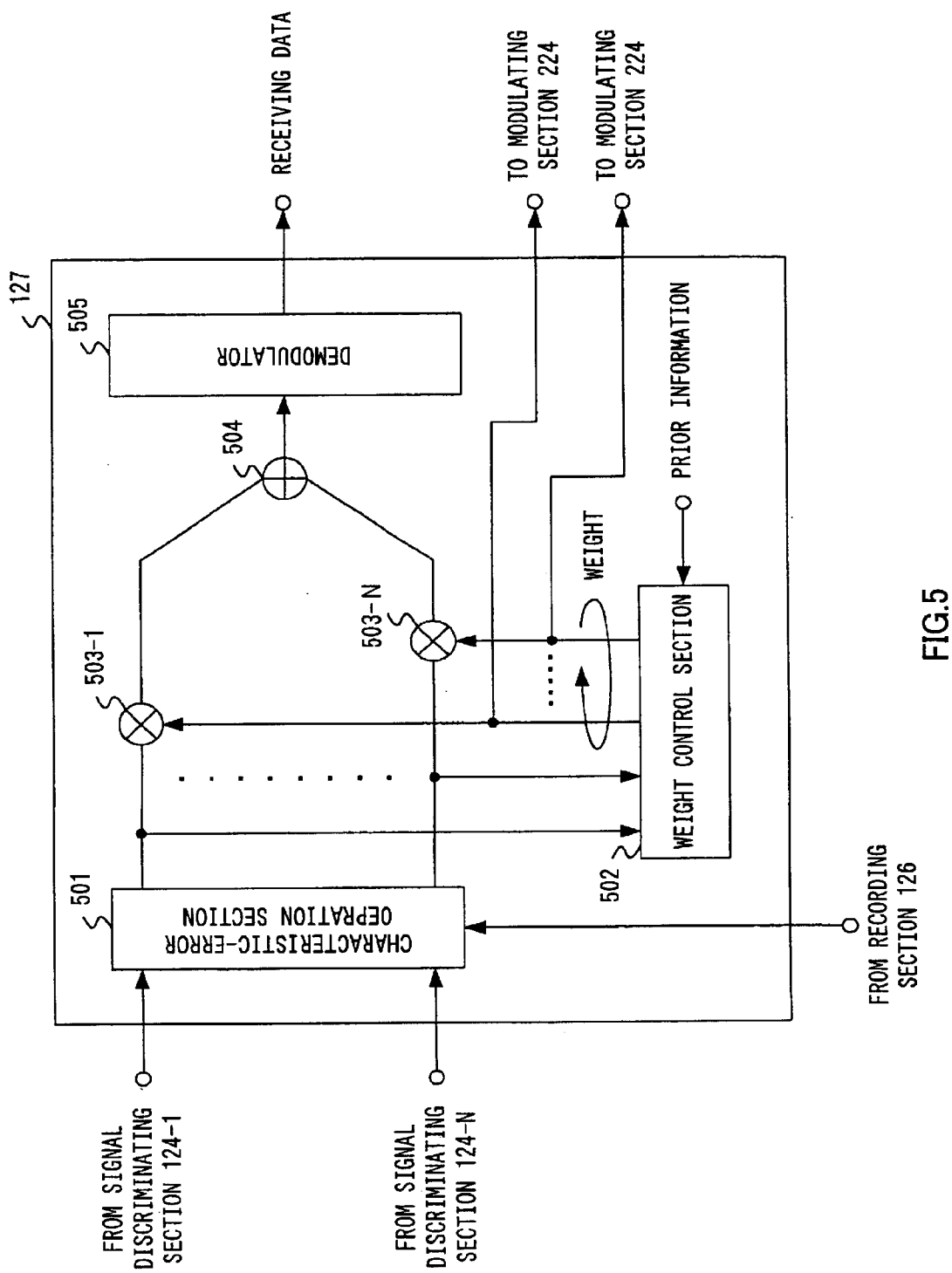
FIG. 5 is a block diagram showing a configuration of a demodulating section provided in the array-antenna base-station apparatus according to the one embodiment of the present invention.

Then, the configuration of the demodulating section 127 will be described, referring to FIG. 5. The characteristic-error operation section 501 cancels the characteristic errors superimposed on the received signals which have been output from the signal discriminating sections 124-1 through 124-N, referring to the measured values of the characteristic errors output from the recording section 126. In a word, as the calibration signals and the received signals are input to the demodulating section 127 passing through the same path, the same characteristic errors caused by the same analog devices are supposed to be superimposed on the above calibration signals and received signals. Accordingly, the above demodulating section 127 may cancel the characteristic errors superimposed on the received signals by subtraction of characteristic errors superimposed on the calibration signals from the received signals. As described above, it is sometimes called as "calibration" in the present description that the characteristic errors measured using the calibration signals are cancelled from the received signals (or, transmitting signals).

The received signals from which the characteristic errors have been cancelled in the characteristic-error operation section 501 are output to a weight control section 502 and multipliers 503-1 through 503-N. The above weight control section 502 estimates the direction of arrival of the received signals; calculates the weights for each path so that received signals arriving from a desired direction may be intensely received (or, interference signals arriving from a predetermined direction may be suppressed), based on the above estimation results and prior information; and outputs the calculated weights to the corresponding multipliers 503-1 through 503-N, and the modulating section 224 shown in FIG. 4, respectively. The multipliers 503-1 through 503-N multiplies the received signals output from the characteristic-error operation section 501 by the weights for output to an adder 504. The above adder 504 generates the received signals with directivity by addition of the received signals output from the multipliers 503-1 through 503-N. The received signals which have had the directivity as described above are demodulated in a demodulator 505 by a predetermined demodulating method such as QPSK (Quaternary Phase Shift Keying) and 16 QAM (Quadrature Amplitude Modulation) to obtain the received data.

Then, operations of the receiving side of the array-antenna base-station apparatus with the above configuration will be described. Here, though the array-antenna base-station apparatus according to the present embodiment is provided with N pieces of antenna elements and N different paths corresponding to each antenna element, a case for only one path corresponding to the antenna element 101-1 will be described, and description of other cases for other paths will be eliminated, as signals passing through whatever paths are processed in a similar manner.

Signals transmitted from the communication terminal apparatus 200 (refer to FIG. 2) are received at the array-antenna base-station apparatus 100 through the antenna elements 101-1 through 101-N. The received signals received through the antenna element 101-1 are sent to the receiving amplifier 111-1 through the duplexer 102-1. The received signals amplified in the receiving amplifier 111-1 are output to the wavelength multiplexing section 113 after conversion into optical signals in the E/O conversion section 112-1. On the other hand, the calibration signals are output from the section 114 for generating calibration signals; amplified in the receiving amplifier 111-1; converted in to optical signals in the E/O conversion section 112-1; and output to the wavelength multiplexing section 113. In the above wavelength multiplexing section 113, the received signals and the calibration signals after conversion into optical signals are multiplexed, and the above multiplexed signals are output to the wavelength separation section 121 through the optical cable 140.

The above multiplexed signals output from the above wavelength multiplexing section 113 are separated for each path in the wavelength separation section 121. That is, the received signals and the calibration signals sent on a path through the receiving amplifier 111-1, the E/O conversion section 112-1, and the wavelength multiplexing section 113 are separated from the multiplexed signals, and output to the O/E conversion section 112-1. Similarly, the received signals and the calibration signals sent on a path through the receiving amplifier 111-N, the E/O conversion section 112-N, and the wavelength multiplexing section 113 are separated from the multiplexed signals, and output to the O/E conversion section 112-N.

The received signals and the calibration signals output from the wavelength separation section 121 are converted into electric signals in the O/E conversion section 122-1, and then output to the signal discriminating section 124-1 after frequency conversion into a baseband frequency band in the frequency conversion section 123-1. The received signals among signals output from the frequency conversion section 123-1 are discriminated from the calibration signals in the signal discriminating section 124-1, and sent to the demodulating section 127. And, the calibration signals among signals output from the frequency conversion section 123-1 are discriminated from the received signals in the signal discriminating section 124-1, and sent to the section 125 for measuring calibration signals.

In the section 125 for measuring calibration signals, the characteristic errors are measured, based on the calibration signals output from the signal discriminating sections 124-1 through 124-N, and the measured characteristic errors are output to the recording section 126. The above characteristic errors are preserved in the recording section 126 as characteristic errors to be calibrated at demodulation in the calibration table. In this case, as the characteristic errors are separately measured for the paths corresponding to the antenna elements 101-1 through 101-N, respectively, the same number of calibration tables as that of the antenna elements are separately provided, too.

In the demodulating section 127, the characteristic errors included in the received signals output from the signal discriminating sections 124-1 through 124-N are cancelled, referring to the calibration tables stored in the recording section 126. Subsequently, the weights are calculated, based on the received signals from which the characteristic errors have been cancelled, and the calculated weights are multiplied by the received signals on each path. The received signals, which have been multiplied by weights as described above, on each path are added each other to generate a combined signal, and demodulating processing of the above combined signal is performed to obtain the received data.

<Transmitting Side>

Figure 4:
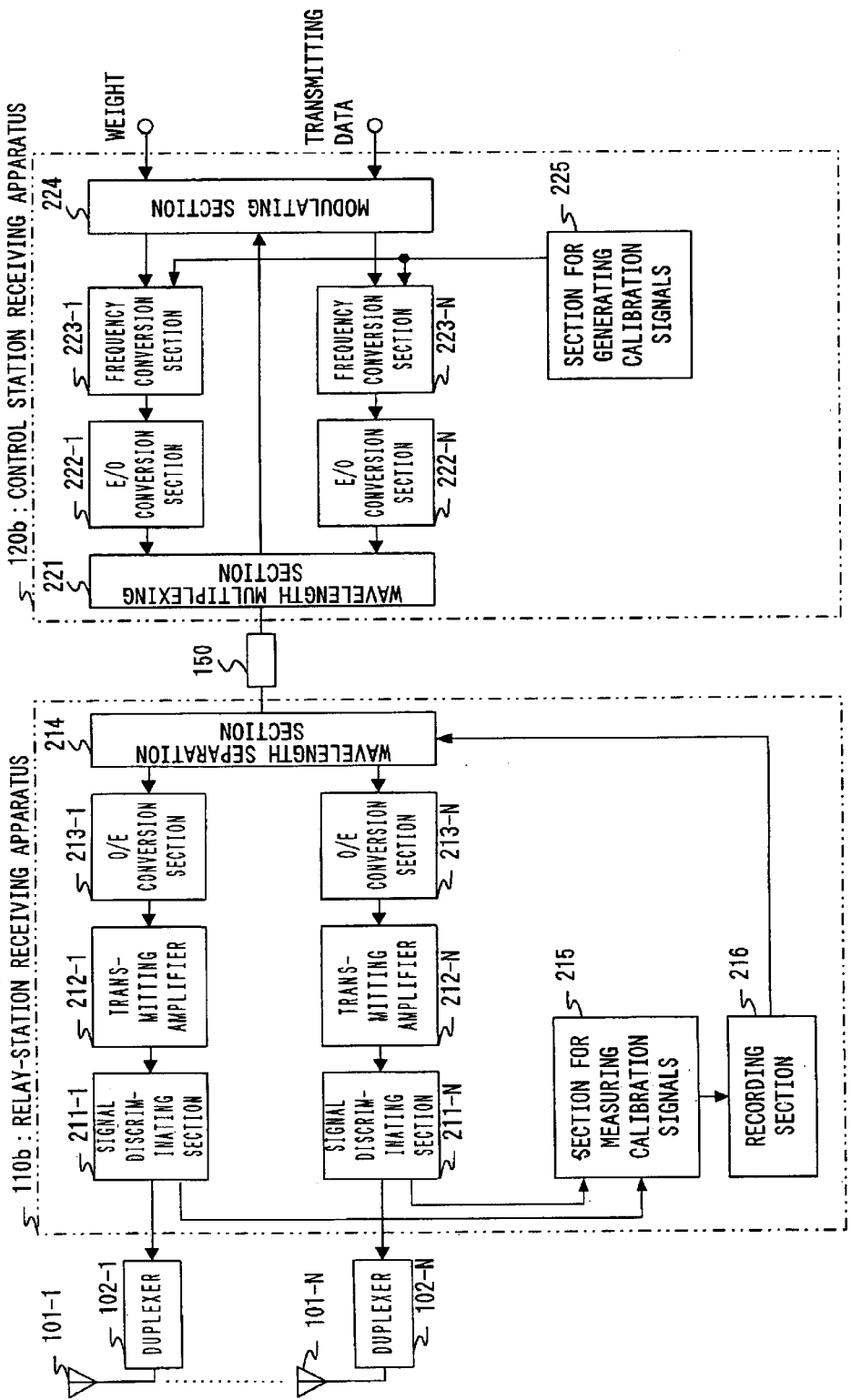
FIG. 4 is a block diagram showing a configuration of the transmitting side of the array-antenna base-station apparatus according to the one embodiment of the present invention.

FIG. 4 is a block diagram showing a configuration of the transmitting side of the array-antenna base-station apparatus according to the present embodiment. As shown in the above drawing, a relay-station transmitting apparatus 110b comprises: signal discriminating sections 211-1 through 211-N; transmitting amplifiers 212-1 through 212-N; O/E conversion sections 213-1 through 213-N; a wavelength separation section 214; a section 215 for measuring calibration signals; and a recording section 216. A control-station transmitting apparatus 120b comprises: a wavelength multiplexing section 221; E/O conversion sections 222-1 through 222-N; frequency conversion sections 223-1 through 223-N; a modulating section 224; and a section 225 for generating calibration signals. The above relay-station transmitting apparatus 110b and the above control-station transmitting apparatus 120b are connected through an optical cable 150.

In the control-station transmitting apparatus 120b, the modulating section 224 generates transmitting signals by primary modulation, such as QPSK, of transmitting data, and characteristic errors are cancelled from the transmitting signals on each path, referring to calibration tables preserved in the recording section 216, as described later. And, the modulating section 224 forms directivity for the transmitting signals by multiplication of the transmitting signals on each path by weights output from the demodulating section 127 (refer to FIG. 3) provided in the control-station receiving apparatus 120*a*. Thus, the generated transmitting signals are output to frequency conversion the corresponding sections 223-1 through 223-N, respectively.

The section 225 for generating calibration signals generates known signals (calibration signals) for calibration, and outputs the above known signals to the frequency conversion sections 223-1 through 223-N. The frequency conversion section 223-1 converts the frequencies of the received signals from the modulating section 224 and the calibration signals from the above section 225 for generating calibration signals to a radio frequency band for output to the E/O conversion section 222-1. Similarly, the frequency conversion section 223-N converts the frequencies of the received signals from the modulating section 224 and the calibration signals from the above section 225 for generating calibration signals to a radio frequency band for output to the E/O conversion section 222-N. The E/O conversion section 222-1 converts the amplified transmitting-signals and the calibration signals from the frequency conversion section 223-1 from electric signals to optical signals, and outputs the optical signals after conversion to the wavelength multiplexing section 221. Similarly, the E/O conversion section 222-N converts the amplified transmitting-signals and the calibration signals from the frequency conversion section 223-N from electric signals to optical signals, and outputs the optical signals after conversion to the wavelength multiplexing section 221. The above wavelength multiplexing section 221 multiplexes the transmitting signals and the calibration signals, which have been output from the E/O conversion sections 222-1 through 222-N after conversion into optical signals, and the multiplexed signals are output to the wavelength separation section 214 through the optical cable 150.

In the relay-station transmitting apparatus 110*b*, the wavelength separation section 214 separates the transmitting signals and the calibration signals output from the wavelength multiplexing section 221 for each path corresponding to antenna elements 101-1 through 101-N for output to the O/E conversion sections 213-1 through 213-N. That is, the wavelength separation section 214 outputs, among the multiplexed signals from the wavelength multiplexing section 221, signals, which have been transmitted on a path passing through the radio transmitters 223-1, the E/O conversion section 222-1, and the wavelength multiplexing section 221, to the O/E conversion section 213-1. Similarly, the wavelength separation section 214 outputs, among the multiplexed signals from the wavelength multiplexing section 221, signals, which have been transmitted on a path passing through the radio transmitter 223-N, the E/O conversion section 222-N, and the wavelength multiplexing section 221, to the O/E conversion section 213-N. Similarly, the received signals and the calibration signals transmitted through other paths are also output to the corresponding O/E conversion section.

The O/E conversion section 213-1 converts the output signals from the wavelength separation section 214 from optical signals to electric signals, and outputs the electric signals after conversion to the transmitting amplifier 212-1. Similarly, the O/E conversion section 213-N converts the output signals from the wavelength separation section 214 from optical signals to electric signals, and outputs the electric signals after conversion to the transmitting amplifier 212-N. The transmission amplifier 212-1 amplifies signals output from the O/E conversion section 213-1 for output to the signal discriminating section 211-1. Similarly, the transmission amplifier 212-N amplifies output signals from the O/E conversion section 213-N for output to the signal discriminating section 211-N. The signal discriminating section 211-1 discriminates the calibration signals from the output signals from the transmitting amplifier 212-1 for output to the section 215 for measuring calibration signals. The signal discriminating section 211-1 discriminates the transmitting signals from the output signals from the transmitting amplifier 212-1 for radio transmission through the antenna element 101-1. And, the signal discriminating section 211-1 discriminates the calibration signals, among signals output from the transmitting amplifier 212-1, as transmitting signals for output to the section 125 for measuring calibration signals. Similarly, the signal discriminating section 211-1 discriminates the transmitting signals, among signals output from the transmitting amplifier 212-N, as calibration signals for radio transmission through the antenna element 101-N. And, the signal discriminating section 211-N discriminates the calibration signals, among signals output from the transmitting amplifier 212-N, as transmitting signals for output to the section 215 for measuring calibration signals.

The section 215 for measuring calibration signals measures the characteristic errors superimposed on the calibration signals output from the signal discriminating sections 211-1 through 211-N. The amplitude fluctuations and the phase rotations, which are caused by analog devices which exists on the path from generation at the section 225 for generating calibration signals to input to the section 215 for measuring calibration signals, are added to the above calibration signals. The above section 215 for measuring calibration signals obtains deviations from the expectation values of the amplitude and the phases of the calibration signals output from the signal discriminating sections 211-1 through 211-N, and the above deviations are supposed to be the characteristic errors. The characteristic errors measured as described above are output to the recording section 216. The above recording section 216 preserves the above characteristic errors sent from the above section 215 for measuring calibration signals in calibration tables. As the above characteristic errors are separately measured for each path of the transmitting circuits, the same number of calibration tables as that of receiving circuits are separately made.

Figure 6:
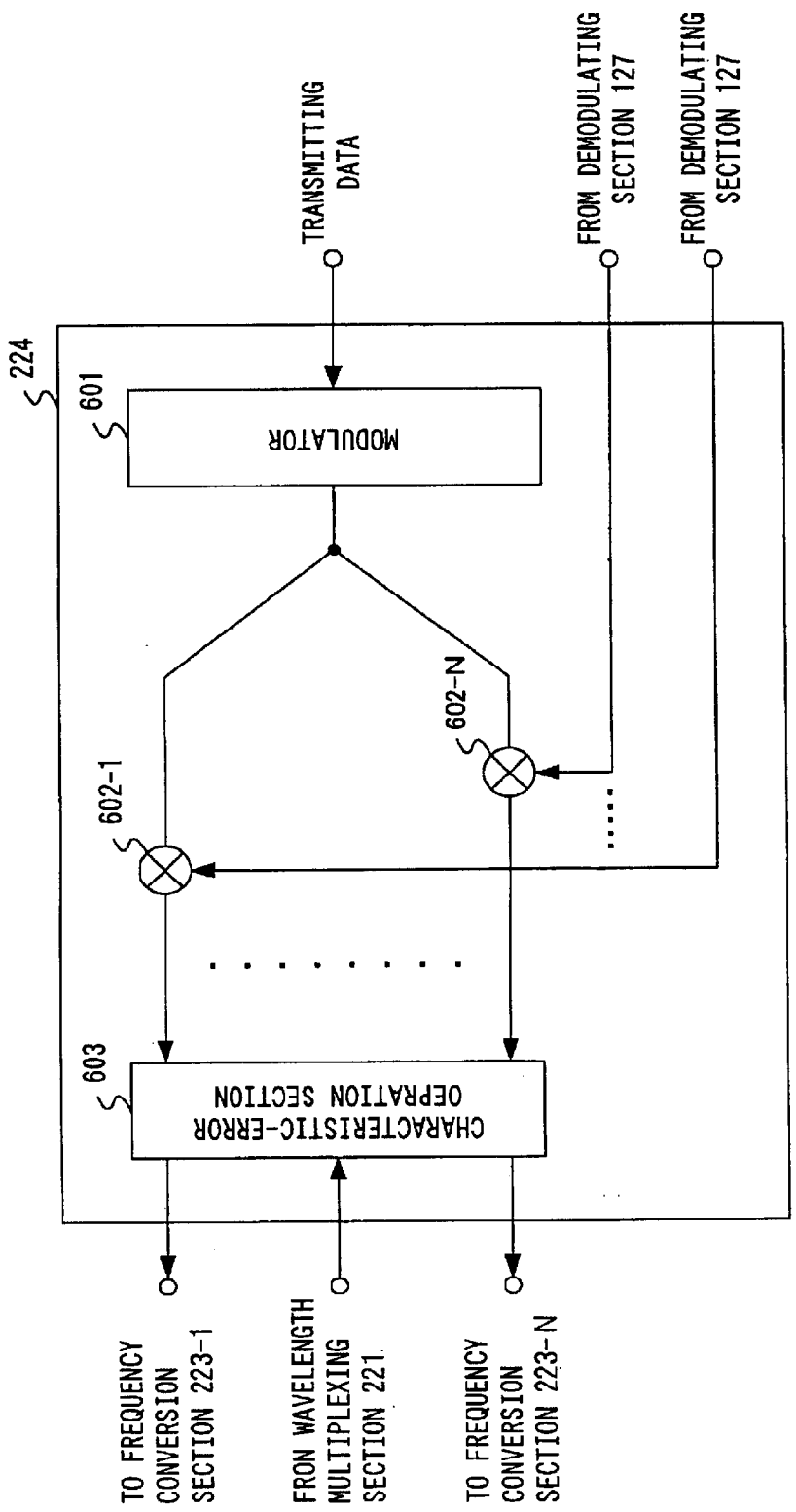
FIG. 6 is a block diagram showing a configuration of a modulating section provided in the array-antenna base-station apparatus according to the one embodiment of the present invention.

Here, a configuration of the modulating section 224 will be described in more detail, referring to FIG. 6. A modulator 601 generates transmitting signals after primary modulation, such as QPSK, of transmitting data, and outputs the generated transmitting signals to multipliers 602-1 through 602-N. The above multipliers 602-1 through 602-N multiplies the above transmitting signals by weights output from the demodulating section 127, and outputs the above transmitting signals after multiplication to a characteristic-error operation section 603.

The above characteristic-error operation section 603 cancells characteristic errors, which are predicted to be superimposed on the transmitting signals in the subsequent processing, referring to the measured values of the characteristic errors output from the wavelength multiplexing section 126. The above characteristic-error operation section 603 may cancell the characteristic errors, which have been added in analog devices before transmission of the transmitting signals from the antenna elements 101-1 through 101-N, for example, by subtracting the characteristic errors superimposed on the calibration signals from the transmitting signals.

Then, operations of the transmitting side of the array-antenna base-station apparatus with the above configuration will be described.

Here, though the array-antenna base-station apparatus according to the present embodiment is provided with N pieces of antenna elements and N different paths corresponding to each antenna element, a case for only one path corresponding to the antenna element 101-1 will be described, and description of other cases for other paths will be sometimes eliminated, as signals passing through whatever paths are processed in a similar manner.

Modulation processing, such as QPSK, of the transmitting data is performed in the modulating section 224, and the characteristic errors on each path are cancelled, referring to the contents of the calibration tables preserved in the recording section 216. In a word, as unknown amplitude fluctuations, the phase rotations, and so on caused by dispersion in the characteristics of analog devices provided in the frequency conversion sections 223-1 through 223-N, the transmitting amplifiers 212-1 through 212-N, and so on are added to the above transmitting signals before output from the antenna elements 101-1 through 101-N, the above characteristic errors are previously cancelled in modulating section 224. And, the transmitting signals on each path, which have been multiplied by weights, are output to the frequency conversion section 223-1 through 223-N in the demodulating section 224. Thereby, the directivity of the transmitting signals is formed. Predetermined radio-transmitting processing of output signals (transmitting signals) of the modulating section 224 is performed in the frequency conversion section 223-1, and the processed signals are converted into optical signals in the E/O conversion section 222-1, and output to the wavelength multiplexing section 221. On the other hand, radio-transmitting processing of the calibration signals output from the section 225 for generating calibration signals is performed in the frequency conversion section 223-1, and the processed signals are converted into optical signals in the E/O conversion section 222-1 and output to the wavelength multiplexing section 221. The transmitting signals and the calibration signals, which have been output from the frequency conversion sections 223-1 through 223-N, and converted into optical signals, are multiplexed in the wavelength multiplexing section 221, and output to the wavelength separation section 214 through the optical cable 150.

The transmitting signals and the calibration signals output from the wavelength multiplexing section 221 are separated into signals on each path in the wavelength separation section 214. That is, among the multiplexed signals output from the above wavelength multiplexing section 221, signals transmitted on a path passing through the radio transmitters 223-1, the E/O conversion section 222-1, and the wavelength multiplexing section 221 are output to the corresponding to the O/E conversion section 213-1. And, among the multiplexed signals output from the above wavelength multiplexing section 221, signals transmitted on a path passing through the radio transmitters 223-N, the E/O conversion section 222-N, and the wavelength multiplexing section 221 are output to the corresponding to the O/E conversion section 213-N. Here, the received signals and the calibration signals sent through other paths are also output to the corresponding O/E conversion section.

Predetermined radio-transmitting processing of the transmitting signals and the calibration signals, which have been output from the wavelength separation sections 214, and converted from optical signals into electric signals in the O/E conversion section 213-1, is performed in the transmitting amplifier 212-1, and output to the signal discriminating section 211-1. The calibration signals, among signals output from the transmitting amplifier 212-1, are discriminated as the received signals, and sent to the section 215 for measuring the calibration signals in the signal discriminating section 211-1. In the above section 215 for measuring the calibration signals, the characteristic errors are measured based on the calibration signals from the signal discriminating sections 211-1 through 211-N, and the measured characteristic errors are sent to the recording section 216, and preserved in the calibration tables of the above recording section 216 as characteristic errors to be calibrated at demodulation. As the above characteristic errors are separately measured for each path corresponding to the antenna elements 101-1 through 101-N, respectively, the same number of calibration tables as that of receiving circuits are separately provided.

And, the transmitting signals, among signals output from the transmitting amplifier 212-1, are discriminated in the signal discriminating section 11-1 as the calibration signals, and sent by radio through the antenna elements 101-1 through 101-N.

Thus, loss of signals to be transmitted may be reduced, as the relay-station receiving apparatus and the control-station receiving apparatus are configured to be connected through optical cables, and the relay-station transmitting apparatus and the control-station transmitting apparatus are also done so in the array-antenna base-station apparatus according to the present embodiment. Moreover, the degrees of freedom in selection of installation sites is increased, as signals are multiplexed for transmission, using optical cables to cause no need to provide cables for each path corresponding to antenna elements. In addition, expected directivity may be obtained with good accuracy, as the characteristic errors may be intermittently adjusted by calibration which is performed for segments from the relay-station receiving apparatus to the control-station receiving apparatus, and from the relay-station transmitting apparatus to the control-station transmitting apparatus.

Furthermore, easy installation may be realized, as the characteristic errors may be adjusted after the base station apparatus has been set up to cause no need for adjustment of the base station apparatus at installation by calibration which is performed for segments from the relay-station receiving apparatus to the control-station receiving apparatus, and from the relay-station transmitting apparatus to the control-station transmitting apparatus.

Here, a configuration where either the receiving side or the transmitting side of the base station apparatus perform the calibration may be applied in the present invention, though the above description has been made in the present embodiment for a case where both of the receiving side and the transmitting side of the base station apparatus perform the calibration.

Here, a configuration where an apparatus for generating calibration signals, which transmits calibration signals, may be provided outside the base station apparatus may be applied, though the above description has been made in the present embodiment for a case where the section for generating calibration signals is provided in side the array-antenna base-station apparatus. For example, there may be applied a configuration where the apparatus for generating calibration signals is provided outside the base station apparatus, and calibration signals are transmitted by radio or cable from the above apparatus for generating calibration signals to the array-antenna base-station apparatus.

As described above, according to the present invention, there may be provided the array-antenna base-station apparatus having a configuration where loss of signals transmitted from the relay-station apparatus to the control-station apparatus is small; the degrees of freedom in selection of installation sites is large; and phase rotations and so on caused by the characteristics of analog devices on each circuit may be calibrated.

The present application is based on Japanese published application No. 2000-078410, filed on Mar. 21, 2000, the entire contents of which are incorporated herein by reference.

INDUSTRIAL APPLICABILITY

The present invention is preferably used in a field related with an array-antenna base-station apparatus which adaptively controls the directivity by adding weights to antenna outputs of a plurality of antenna elements.

What is claimed is:

1. An array antenna base station apparatus comprising:
   a plurality of antenna elements;
   a relay station receiving apparatus comprising a converter that converts: (a) individual received signals that are transmitted from a communicating party and respectively received by the plurality of antenna elements and (b) known calibration signals for use for calibration that are respectively multiplexed with the received signals into optical signals;
   an optical fiber transmission channel that transmits the optical signals; and
   a control station receiving apparatus comprising:
      a separator that converts the optical signals transmitted through the optical fiber transmission channel into electrical signals and separates said electrical signals back to the received signals and calibration signals corresponding respectively to the plurality of antenna elements;
      a measurer that measures characteristic errors superimposed upon the calibration signals separated in the separator corresponding respectively to the plurality of antenna elements;
      an error canceller that cancels the characteristic errors measured in the measurer on a per calibration signal basis from the received signals corresponding respectively to the plurality of antenna elements; and
      a directivity former that forms directivity of the received signals corresponding respectively to the plurality of antenna elements having the characteristic errors cancelled using a weight calculated based on the received signals.

2. An array antenna base station apparatus according to claim 1, wherein the relay station receiving apparatus further comprises a calibration signal generator that generates the known calibration signals for use for calibration, which are multiplexed upon the received signals corresponding respectively to the plurality of antenna elements.

3. An array antenna base station apparatus according to claim 1, wherein the relay station receiving apparatus receives the signals from the communicating party and the known calibration signals for use for calibration transmitted from a calibration signal generator through the plurality of antenna elements.

4. An array antenna base station apparatus comprising:
   a plurality of antenna elements;
   a control station transmitting apparatus comprising:
      a calibration signal generator that generates known calibration signals for use for calibration;
      a canceller that cancels characteristic errors superimposed upon transmitting signals corresponding respectively to the plurality of antenna elements;
      a modulator that multiplies the transmitting signals corresponding respectively to the plurality of antenna elements by weights and generates the transmitting signals with directivity; and
      a converter that converts the transmitting signals with directivity generated in the modulator and the calibration signals generated in the calibration signal generator into optical signals;
   a optical fiber transmission channel that transmits the optical signals;
   a separator that converts the optical signals transmitted through the optical fiber transmission channel into electrical signals and separates said electrical signals back to the received signals and calibration signals corresponding respectively to the plurality of antenna elements; and
   a measurer that measures characteristic errors superimposed upon the calibration signals separated in the separator corresponding respectively to the plurality of antenna elements, wherein
   the canceller cancels characteristic errors superimposed upon the transmitting signals corresponding respectively to the plurality of antenna elements based on the characteristic errors measured in the measurer.

5. An array antenna base station apparatus comprising:
   a plurality of antenna elements;
   a relay station apparatus comprising a relay station receiving apparatus and a relay station transmitting apparatus; and
   a control station apparatus comprising a control station receiving apparatus and a control station transmitting apparatus, wherein:
   the relay station receiving apparatus transmits signals to the control station receiving apparatus through a first optical fiber transmitting channel,
   the control station transmitting apparatus transmits signals to the relay station transmitting apparatus through a second optical fiber transmitting channel,
   the relay station receiving apparatus comprises a first converter that converts: (a) individual received signals that are transmitted from a communicating party and respectively received by the plurality of antenna elements and (b) known calibration signals for use for calibration that are respectively multiplexed with the received signals into optical signals,
   the control station receiving apparatus comprises:
      a first separator that converts the optical signals transmitted through the first optical fiber transmission channel into electrical signals and separates said electrical signals back to the received signals and calibration signals corresponding respectively to the plurality of antenna elements;
      a first measurer that measures characteristic errors superimposed upon the calibration signals separated in the first separator corresponding respectively to the plurality of antenna elements;
      a first error canceller that cancels the characteristic errors measured in the first measurer on a per calibration signal basis from the received signals corresponding respectively to the plurality of antenna elements; and
      a directivity former that forms directivity of the received signals corresponding respectively to the plurality of antenna elements having the characteristic errors cancelled, using a weight calculated based on the received signals, the control station transmitting apparatus comprises:

a calibration signal generator that generates known calibration signals for use for calibration;

a second canceller that cancels characteristic errors superimposed upon transmitting signals corresponding respectively to the plurality of antenna elements;

a modulator that multiplies the transmitting signals corresponding respectively to the plurality of antenna elements by weights and generates the transmitting signals with directivity; and a second converter that converts the transmitting signals with directivity generated in the modulator and the calibration signals generated in the calibration signal generator into optical signals, the relay station transmitting apparatus comprises:

a second separator that converts the optical signals transmitted through the second optical fiber transmission channel into electrical signals and separates said electrical signals back to the received signals and calibration signals corresponding respectively to the plurality of antenna elements; and a second measurer that measures characteristic errors superimposed upon the calibration signals separated in the second separator corresponding respectively to the plurality of antenna elements, the second canceller cancels characteristic errors superimposed upon the transmitting signals corresponding respectively to the plurality of antenna elements based on the characteristic errors measured in the second measurer.

6. A method for directional reception, comprising the steps of:

(i) converting signals received through a plurality of antenna elements in a relay station receiving apparatus and known calibration signals for use for calibration that are respectively multiplexed with the received signals into optical signals;

(ii) transmitting the optical signals to a control station receiving apparatus through an optical fiber channel;

(iii) converting the optical signals transmitted through the optical fiber transmission channel into electrical signals and separating said electrical signals back to the received signals and calibration signals corresponding respectively to the plurality of antenna elements;

(iv) measuring characteristic errors superimposed upon the calibration signals separated in step (iii) corresponding respectively to the plurality of antenna elements;

(v) canceling the measured characteristic errors measured in step (iv) from the received signals corresponding respectively to the plurality of antenna elements; and (vi) calculating a weight based on the received signals corresponding respectively to the plurality of antenna elements having the characteristic errors cancelled in step (v); and (vii) forming directivity of the received signals using the weight calculated in step (vi).

7. A method for transmitting radio signals with directivity from a plurality of antenna elements, comprising the steps of:

(i) generating known calibration signals for use for calibration;

(ii) multiplying transmitting signals corresponding respectively to the plurality of antenna elements by weights and generating the transmitting signals with directivity;

(iii) converting the transmitting signals with directivity and the calibration signals into optical signals;

(iv) transmitting the transmitting signals through an optical fiber channel;

(v) converting the optical signals transmitted through the optical fiber channel into electrical signals and separating said electrical signals back to the transmitting signals and calibration signals corresponding respectively to the plurality of antenna elements;

(vi) measuring characteristic errors superimposed upon the calibration signals separated in step (v) corresponding respectively to the plurality of antenna elements; and (vii) canceling characteristic errors superimposed upon the transmitting signals corresponding respectively to the plurality of antenna elements based on the characteristic errors measured in step (vi).

* * * * *